(12) United States Patent
Malapanes

(10) Patent No.: US 7,134,451 B1
(45) Date of Patent: Nov. 14, 2006

(54) METERING FAUCET ASSEMBLY INCLUDING TEMPERATURE CONTROL

(75) Inventor: Eric Malapanes, Addison, IL (US)

(73) Assignee: Geberit Technik AG, Jona (CH)

( * ) Notice: Subject to any disclaimer, the term of this patent is extended or adjusted under 35 U.S.C. 154(b) by 267 days.

(21) Appl. No.: 10/962,149

(22) Filed: Oct. 7, 2004

Related U.S. Application Data

(60) Provisional application No. 60/535,233, filed on Jan. 9, 2004.

(51) Int. Cl.
*F16K 11/085* (2006.01)
*F16K 31/143* (2006.01)

(52) U.S. Cl. .............. 137/625.4; 137/636.4; 137/607; 251/35; 251/39

(58) Field of Classification Search .......... 137/625.4, 137/625.41, 636.4, 607; 251/35, 38, 39
See application file for complete search history.

(56) References Cited

U.S. PATENT DOCUMENTS

| | | | |
|---|---|---|---|
| 2,980,130 A * | 4/1961 | Harke | 137/636.4 |
| 4,241,759 A * | 12/1980 | Billeter | 137/636.4 |
| 4,285,361 A * | 8/1981 | Lissau | 137/636.4 |
| 4,457,452 A | 7/1984 | Symmons | |
| 4,899,778 A | 2/1990 | Laube | |
| 4,991,819 A | 2/1991 | Laube | |
| 5,295,654 A | 3/1994 | Laube | |
| 6,626,649 B1 | 9/2003 | Cowans | |

FOREIGN PATENT DOCUMENTS

EP 21957 A1 * 1/1981 ............... 137/636.4

* cited by examiner

Primary Examiner—John Rivell
(74) Attorney, Agent, or Firm—Reinhart Boerner Van Deuren s.c.

(57) ABSTRACT

A metering faucet assembly includes a metering cartridge valve assembly and a separate mixing control valve having a mixing valve stem that is offset relative to a valve actuator for the cartridge valve assembly and coupled to the valve actuator by a coupling mechanism that allows both the mixing valve and the cartridge valve assembly to be operated by a common operating handle. The coupling mechanism includes a slip gear mechanism that allows reciprocating movement of the operating member of the cartridge valve assembly to operate the cartridge valve and rotational movement of a mixing valve stem to operate the mixing valve. The slip gear mechanism provides an end of travel limit for the mixing valve stem and allows adjustment in the temperature limit of the hot or cold water in the mix.

39 Claims, 12 Drawing Sheets

METERING FAUCET ASSEMBLY INCLUDING TEMPERATURE CONTROL

CROSS-REFERENCE TO RELATED APPLICATION

This application claims priority of provisional application Ser. No. 60/535,233, which was filed on Jan. 9, 2004, and which is entitled "Metering Faucet Assembly Including Temperature Control", which application is incorporated herein by reference.

BACKGROUND OF THE INVENTION

Field of the Invention

The present invention relates generally to manually operated flow metering faucets, and more particularly, to a metering faucet that provides for adjustment in the mix of the metered amount of hot and cold water discharged by the faucet.

Many faucets, particularly those used in commercial installations, include metering valves to limit the amount of water discharged by the faucet in each operating cycle in order to minimize waste of water. Most metering faucet assemblies currently in use include valves that are designed to be manually operated open and, after release of the operating handle, to close after a metered amount of water has been discharged. Automatic metering faucet assemblies have been introduced which are operated in response to detection of a user's hands coming into the proximity of the faucet assembly. A further improvement in such faucet assemblies is the introduction of a metering cartridge valve to facilitate maintenance of the metering faucet assembly.

In most known metering faucet installations, the relative proportions of hot and cold water in the mix are factory preset. Commercial metering faucet assemblies have been proposed that allow adjustment in the amounts of hot and cold water in the mix, and thus the temperature of the water being discharged by the metering faucet. One such automatic metering faucet incorporating a temperature adjustment feature is disclosed in U.S. Pat. No. 4,457,452. The automatic metering faucet includes a shut off valve having a mixing valve member disposed at the inlet of the shutoff valve. However, the mixing valve member is a component of the shutoff valve and is disposed in an in-line configuration with the valve actuator for the shutoff valve. Accordingly, service or replacement of the shut valve requires disassembly of the entire valve mechanism for this metering faucet.

It is accordingly the primary objective of the present invention that it provide an improved metering faucet assembly.

Another objective of the invention is that it provide a faucet assembly that provides for adjustment in the proportions of hot and cold water in the mix being discharged by the faucet assembly.

Another objective of the invention is that it provide a metering faucet assembly including temperature adjustment and which is easy to service and to maintain.

Another objective of the invention is that it provide a faucet assembly including a hot and cold water mix adjustment that provides for adjustment in the maximum amount of hot water in the mix of hot and cold water, thereby limiting the maximum temperature for water being discharged by the faucet assembly.

The apparatus of the present invention must also be of construction which is both durable and long lasting, and it should also require little or no maintenance to be provided by the user throughout its operating lifetime. In order to enhance the market appeal of the apparatus of the present invention, it should also be of inexpensive construction to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present invention. With this invention, there is provided a faucet assembly that allows adjustment in the proportions of hot and cold water in the mix of water being discharged by the faucet assembly.

The faucet assembly includes a casing defining a cavity within which is disposed a fluid flow control mechanism. The faucet assembly further includes a mixing valve separate from the fluid flow control mechanism and having an operating member mounted on the casing, the operating member having an axis that extends along an axis that is offset with respect to an operating axis for the fluid flow control mechanism. A coupling mechanism couples an actuator member for the fluid flow control mechanism to the mixing valve operating member, allowing the fluid flow control mechanism and the mixing valve to be operated by a common operating handle. The coupling mechanism includes a slip gear mechanism that allows the actuator member to be moved axially and rotatably relative to the mixing valve operating member, allowing use of a single operating handle to operate both the mixing valve and the fluid flow control mechanism.

In accordance with the invention, the mixing valve is separate from a fluid flow control valve of the fluid flow control mechanism, which can comprise a metering cartridge assembly. The combination of a metering cartridge assembly and a separate mixing valve, the valve stem of which is offset with respect to the actuator for the fluid flow control valve, facilitates repair of the metering faucet assembly when necessary, including replacement of fluid flow valve components, without requiring complete disassembly of the metering faucet assembly.

In accordance with a feature of the invention, the coupling mechanism provides travel limit stops for the mixing valve operating member. Moreover, the coupling mechanism is configured to provide a plurality of points of contact between mating surfaces of a coupling gear of the coupling mechanism and the operating handle to minimize chances of damage to the coupling gear and to minimize stress on the gear teeth as well as accounting for side loading forces. In addition, the coupling mechanism provides an adjustable temperature limit at least for the amount of hot water in the mix by allowing relative repositioning of the mixing valve operating member with respect to the coupling gear. Also, the slip gear mechanism includes an indexing arrangement that ensures that the mixing valve operating member is mounted on the casing with the proper orientation with respect to the operating handle.

It may therefore be seen that a preferred embodiment of the present invention provides a metering faucet assembly that includes a metering cartridge valve assembly and a separate mixing valve having a mixing valve stem that is offset relative to a valve actuator for the cartridge valve assembly. The mixing valve stem is coupled to the valve actuator by a coupling mechanism that allows both the mixing valve and the cartridge valve to be operated by a common operating handle. Moreover, the coupling mechanism includes a slip gear mechanism that allows reciprocating movement of the valve actuator for the cartridge valve assembly and rotational movement of the mixing valve stem. In addition, the coupling mechanism provides an end of travel limit for the mixing valve stem and is adjustable to provide adjustment in the temperature limit of the hot water, for example, in the mix.

The apparatus of the present invention is of a construction which is both durable and long lasting, and which will require little or no maintenance to be provided by the user throughout its operating lifetime. The apparatus of the present invention is also of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present invention are best understood with reference to the drawings, in which.

DETAILED DESCRIPTION OF THE PREFERRED EMBODIMENT

Figure 1:
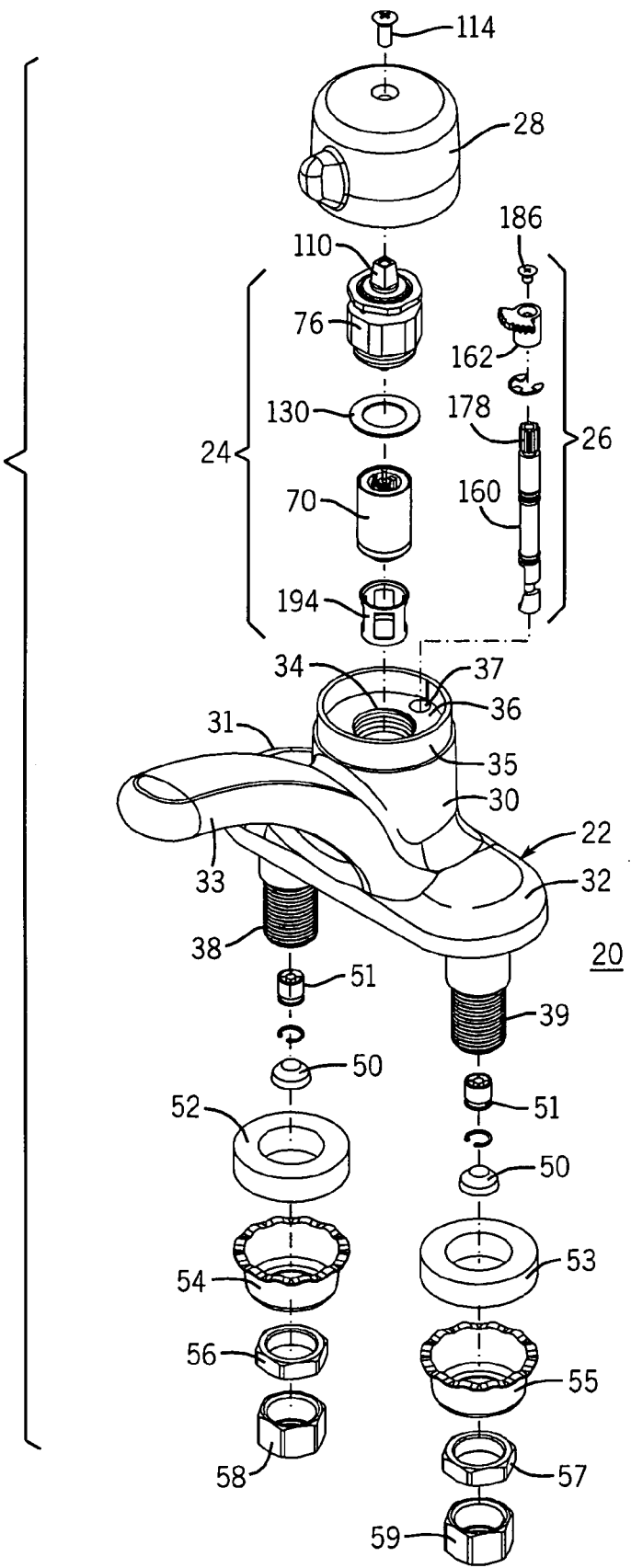
FIG. 1 is an exploded isometric view of a metering faucet assembly with temperature control provided by the invention.

Referring to FIG. 1 of the drawings, there is illustrated an exploded isometric view of a metering faucet assembly 20 including temperature control in accordance with the present invention. The major components of the metering faucet assembly 20 include a casing 22, a fluid flow control mechanism 24, a mixing valve stem assembly 26, and an operating handle 28. The metering faucet assembly 20 is described with reference to use in lavatory sinks or basins, etc. However, the metering faucet assembly can be used in other applications requiring discharging of metered amounts of a fluid mix of first and second fluids wherein it is desirable to adjust the relative proportions of the two fluids.

Casing

Figure 2:
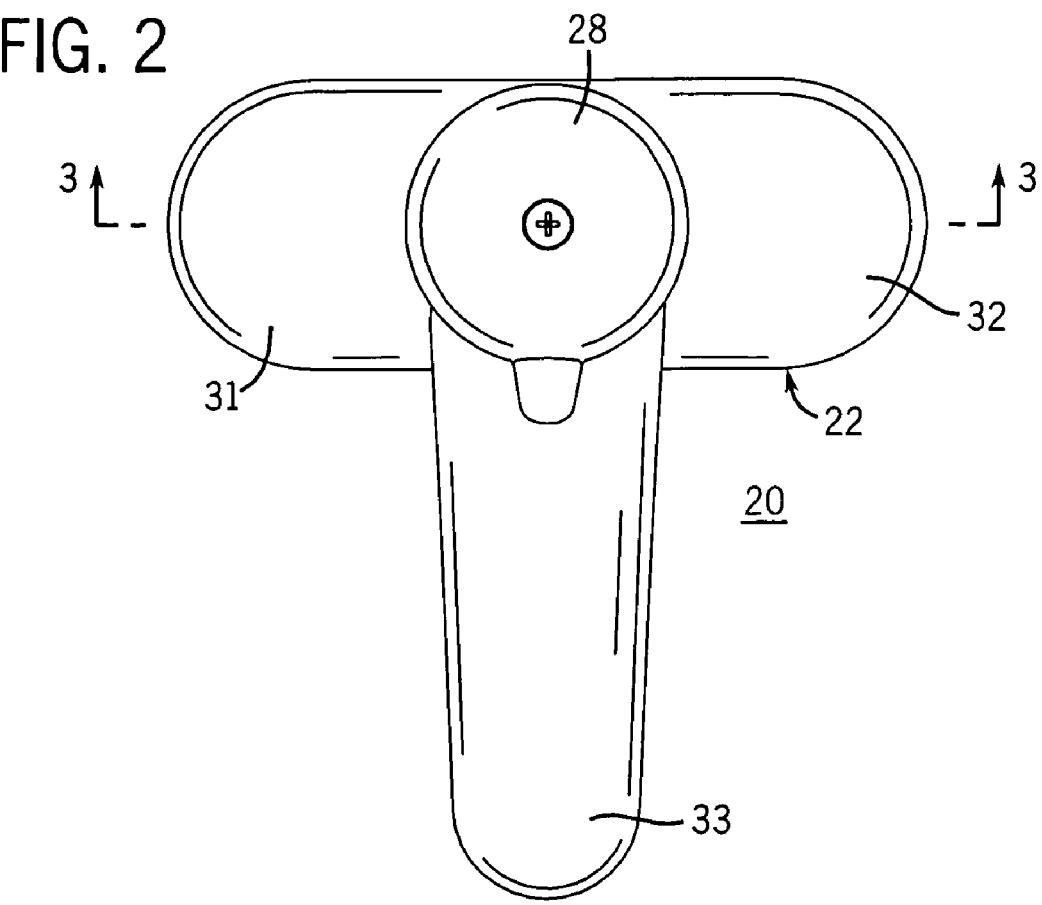
FIG. 2 is a top plan view of the metering faucet assembly of FIG. 1.
Figure 9:
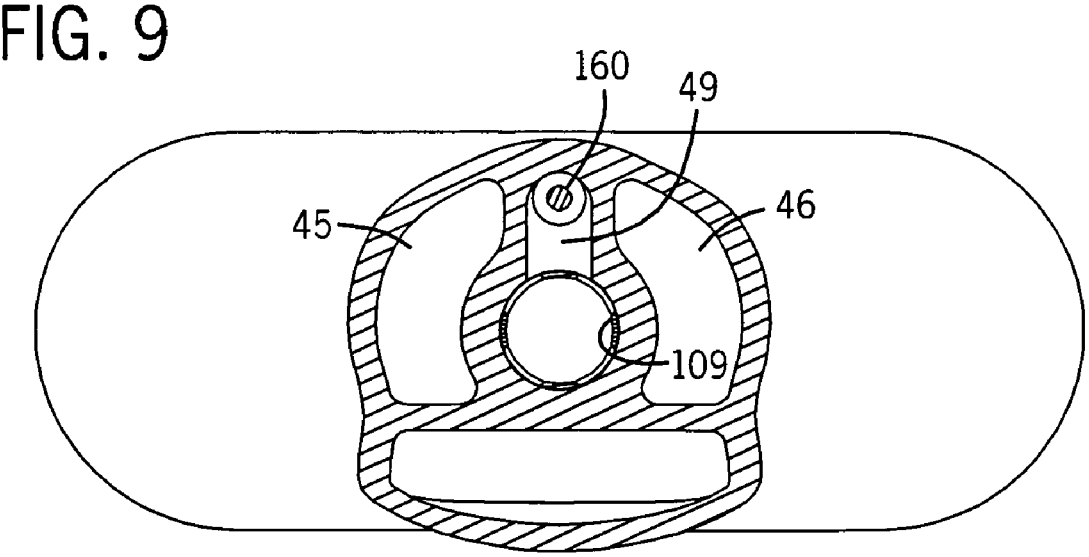
FIG. 9 is a transverse section view of the metering faucet assembly taken along the line 9—9 of FIG. 4.
Figure 3:
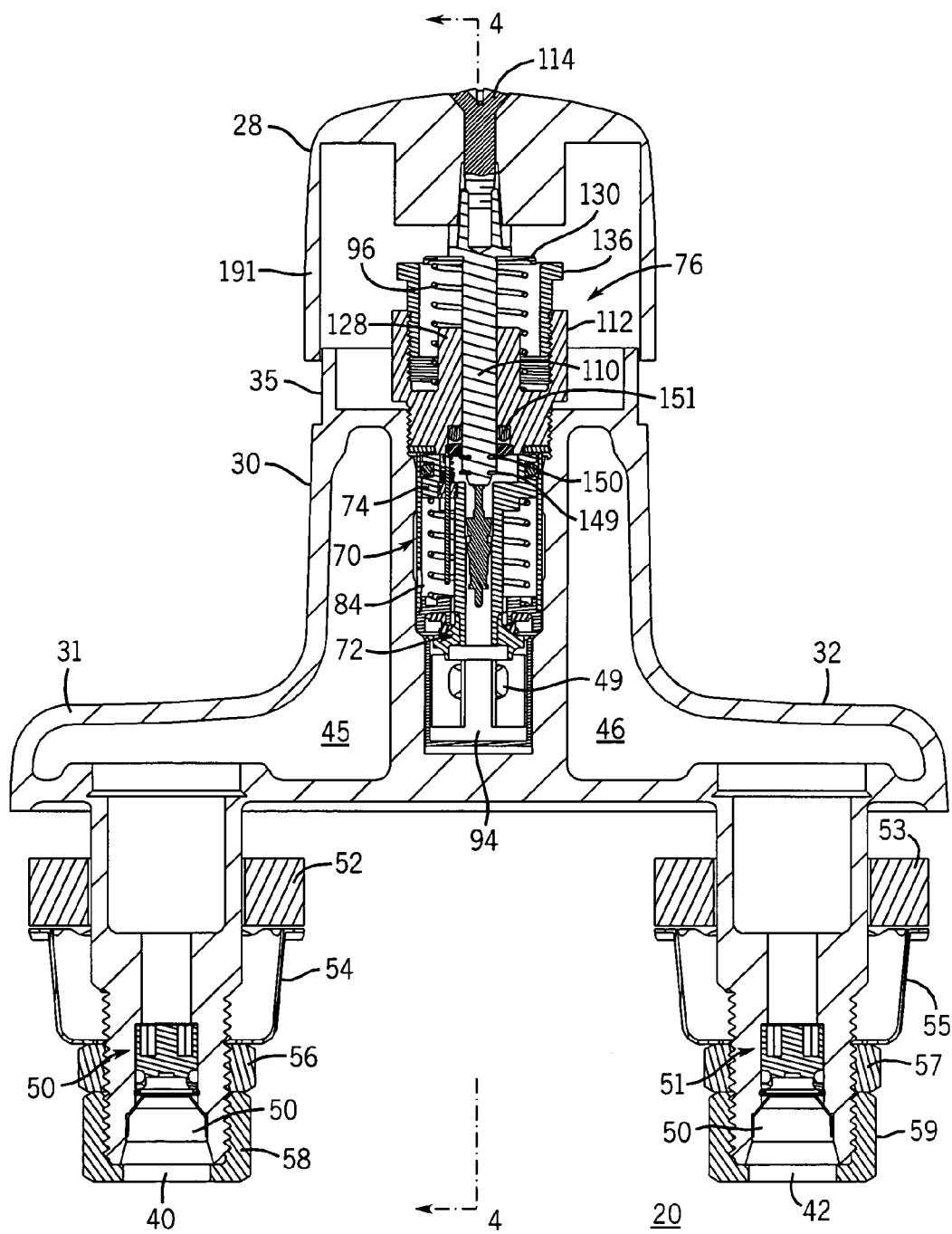
FIG. 3 is a vertical section view taken along the line 3—3 of FIG. 2.
Figure 4:
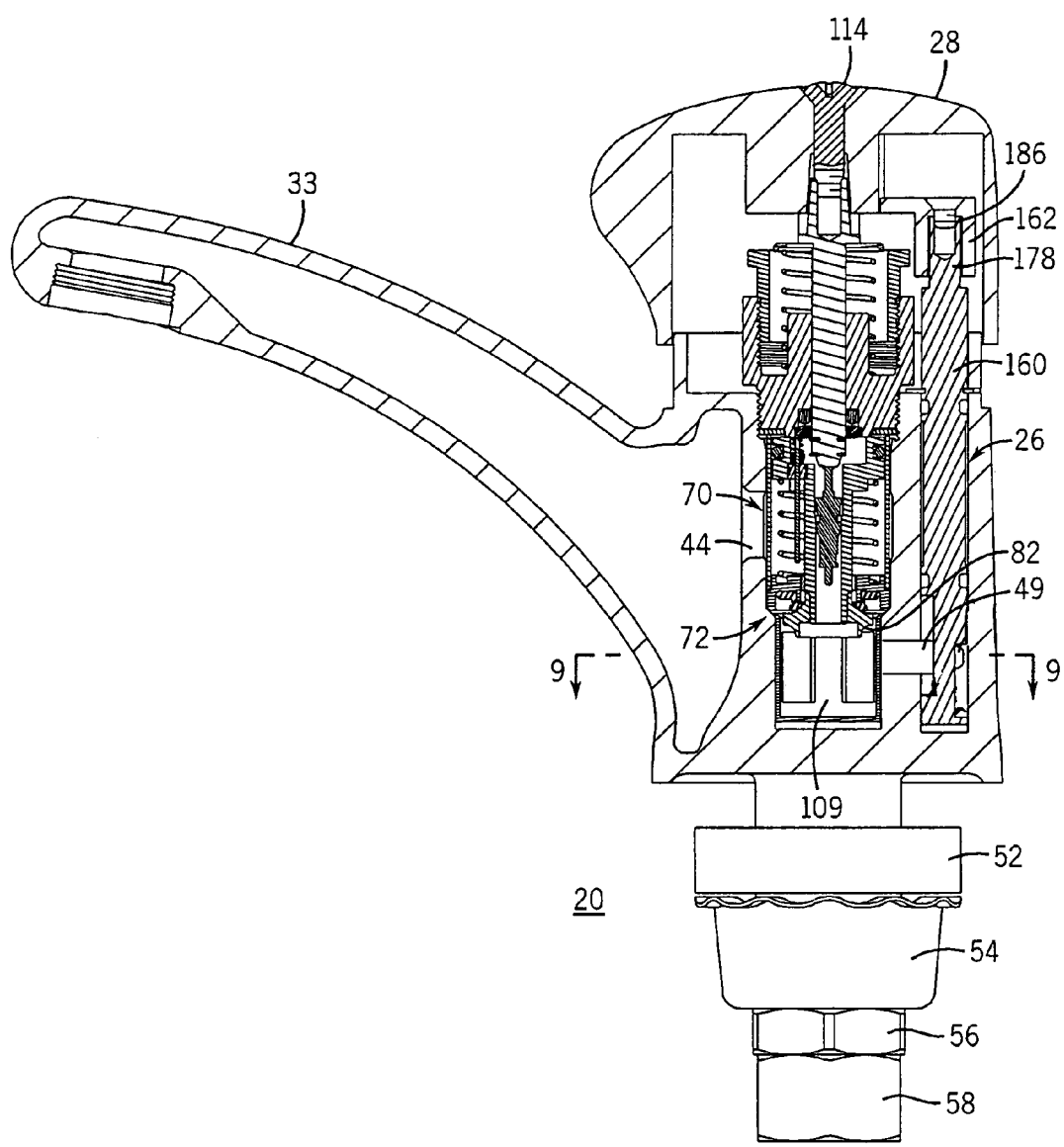
FIG. 4 is a vertical section view taken along the line 4—4 of FIG. 3.

Referring to FIGS. 1 and 2, the casing 22 has an upstanding neck portion 30, shoulders 31 and 32 that extend laterally from the neck portion 30, and a spout 33 that projects forwardly at the front of the casing 22. The neck portion 30 is generally cylindrical in shape and includes a central cavity 34 within which is mounted the fluid flow control mechanism 24 as shown in FIGS. 3 and 4, for example. The neck portion 30 includes an annular collar 35 that defines a recessed upper end 36 for the neck portion. The neck portion 30 further includes a longitudinal bore 37 within which is mounted the mixing valve stem assembly 26 as shown in FIG. 4. The bore 37 is offset rearwardly of the central cavity 34 so that the mixing valve stem assembly 26 is displaced or offset relative to the fluid flow control mechanism 24 in the casing 22.

The casing 22 includes downwardly projecting legs 38 and 39 that are adapted for mounting the metering faucet assembly on a sink or basin (not shown). Mounted in the legs 38 and 39 are check valves, indicated generally at 51, that prevent back flow of hot and cold water into the cold and hot water supply lines and filter screens, indicated generally at 50, that keep sediment out of the check valves. The metering faucet assembly 20 is secured to a sink or basin by mounting hardware that is received on the legs 38 and 39. By way of example, the mounting hardware can include spacers 52 and 53, cup cake washers 54 and 55, nuts 56 and 57 and supply coupling nuts 58 and 59 which are shown in FIG. 1.

Referring to FIGS. 1 and 5–7, the legs 38 and 39 define fluid inlets 40 and 42, respectively, for the metering faucet assembly 20. For purposes of description of the metering faucet assembly 20, fluid inlet 40 is assumed to be a hot water inlet and fluid inlet 42 is assumed to be a cold water inlet. Thus, leg 38 is adapted to receive a connection to a hot water supply conduit and leg 39 is adapted to receive a connection to a cold water supply conduit. The casing 22 further includes a fluid outlet 44 that is in fluid communication with the spout 33 of the casing 22.

Referring to FIGS. 1, 3, 6, 7 and 8, the shoulder 31 defines a hot water inlet chamber 45 and the shoulder 32 defines a cold water inlet chamber 46. The hot water inlet chamber 45 is interposed between the hot water inlet 40 and a hot water inlet port 47 formed through the sidewall of the bore 37. The cold water inlet chamber 46 is interposed between the cold water inlet 42 and a cold water inlet port 48 formed through the sidewall of the bore 37. The hot and cold water inlet ports 47 and 48 together with the mixing valve stem assembly 26 form a mixing valve for the metering faucet assembly 20 as will be described. The interior of the bore 37 is communicated with the interior of the central cavity 34 through a further aperture and an outlet channel, indicated generally by reference numeral 49.

Figure 8:
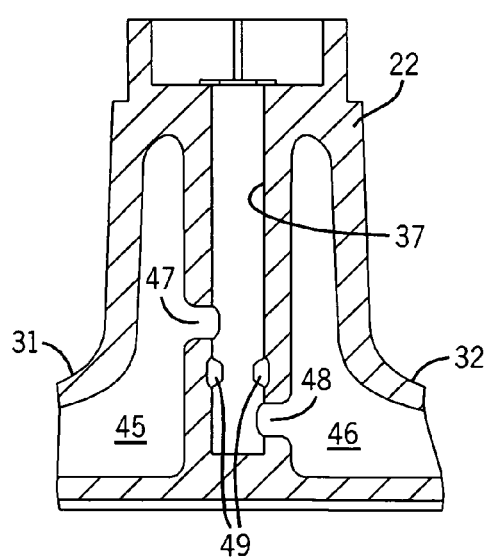
FIG. 8 is a vertical section view taken along the line 8—8 of FIG. 5.

As shown in FIG. 8, the hot and cold water inlet ports 47 and 48 are disposed at different elevations on the casing 22 to facilitate controlled introduction of hot and cold water to the hot and cold water mix at the inlet to a shutoff valve of the fluid flow control mechanism 24. In the embodiment illustrated, the hot water inlet port 47 is located higher on the casing than is the cold water inlet port 48. Alternatively the hot water inlet port 47 can be located lower on the casing 22 than the cold water inlet port 48.

Figure 10:
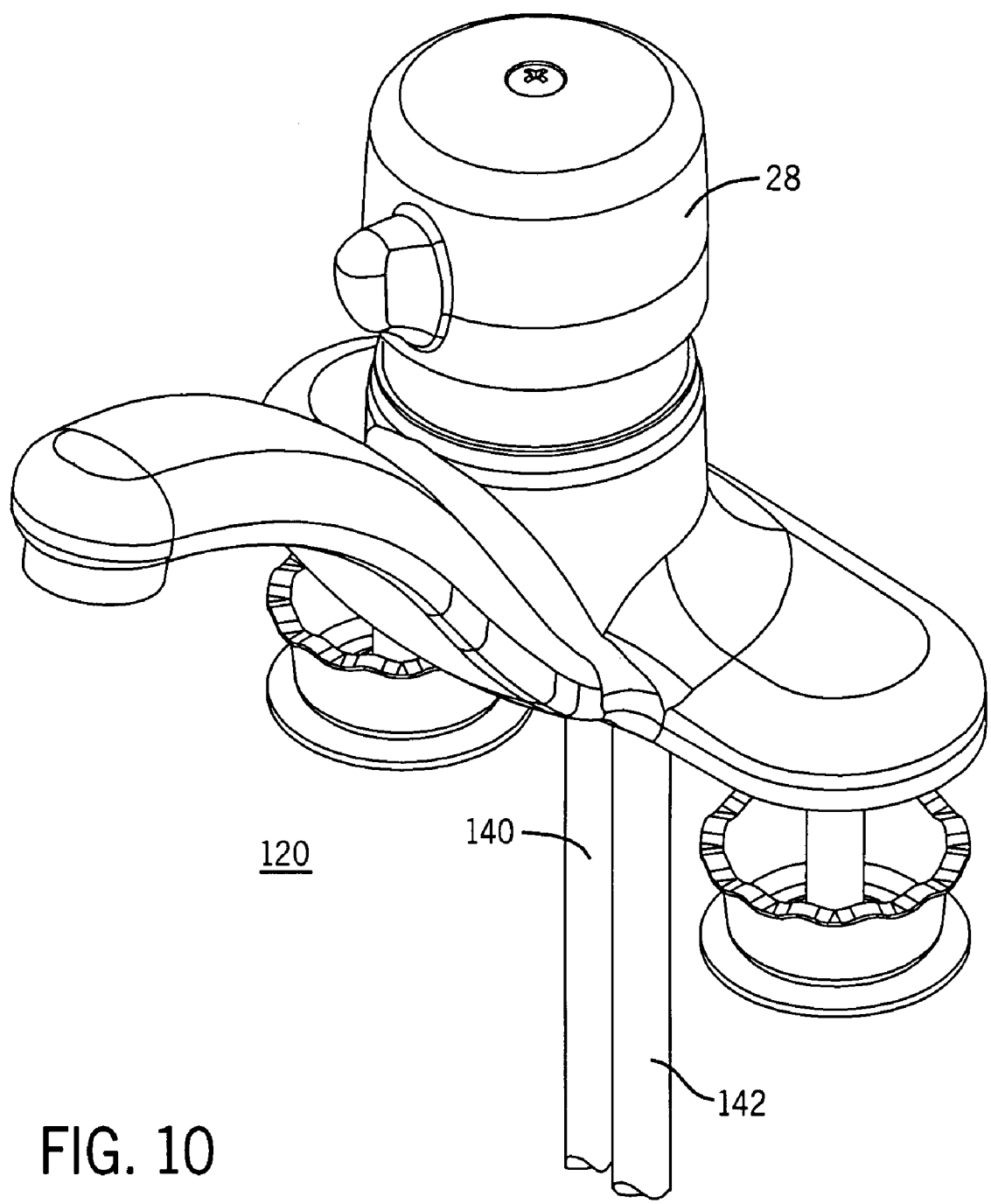
FIG. 10 is an isometric view of an alternative metering faucet assembly with temperature control provided by the invention.

In the embodiment described above with reference to FIGS. 1–9, the hot and cold water inlets are introduced at opposite sides of the faucet. Alternatively, in the metering faucet assembly 120 illustrated in FIG. 10, hot and cold water inlets 140 and 142 can be located at or near the center of the faucet assembly, as shown in FIG. 10. The hot and cold water inlets can be communicated with the hot and cold water inlet chambers 45 and 46 (FIG. 3), and the mixing valve of the metering faucet assembly 20 (FIGS. 1–9) can be used in adjusting the proportions of hot and cold water in the manner to be described. In a further alternative, the hot and cold water inlets can be located at or near the center of the faucet assembly (FIG. 10) and can be connected via fluid conduits directly to the hot and cold water inlet ports 47 and 48 without hot and cold water inlet chambers 45 and 46. Moreover, it will be apparent to those skilled in the art that other arrangements are possible for supplying hot and cold water to a mixing valve that is separate from a shut off valve and has an operating member that is operated along an axis displaced from the operating axis of the shut off valve.

Fluid Flow Control Mechanism

Referring to FIGS. 1, 3, 4 and 4A, the fluid flow control mechanism 24 includes a fluid flow control valve, such as a valve cartridge assembly 70, including a shutoff valve indicated generally at 72 and a metering valve 74. The shutoff valve 72 controls the flow of fluid through the valve cartridge 70. The metering valve 74 is preset to establish the length of time that the shutoff valve 72, once actuated in response to the operating handle 28 being depressed, remains in the fluid flow permitting condition upon release of the operating handle, and thus the amount of water that is discharged by the metering faucet assembly 20 for a given operating cycle. The fluid flow control mechanism 24 further includes an actuator assembly 76 for operating the shutoff valve 72 and the metering valve 74.

The valve cartridge assembly 70 can be generally similar to the metering valves disclosed in U.S. Pat. Nos. 4,899,778, 4,991,819 and 5,295,654 and to a metering cartridge unit that is commercially available from Chicago Faucet Company, Des Plaines Ill. as the type 671-XJKNF Metering Cartridge Unit. Accordingly, the valve cartridge assembly 70 will not be described in detail.

Figure 4A:
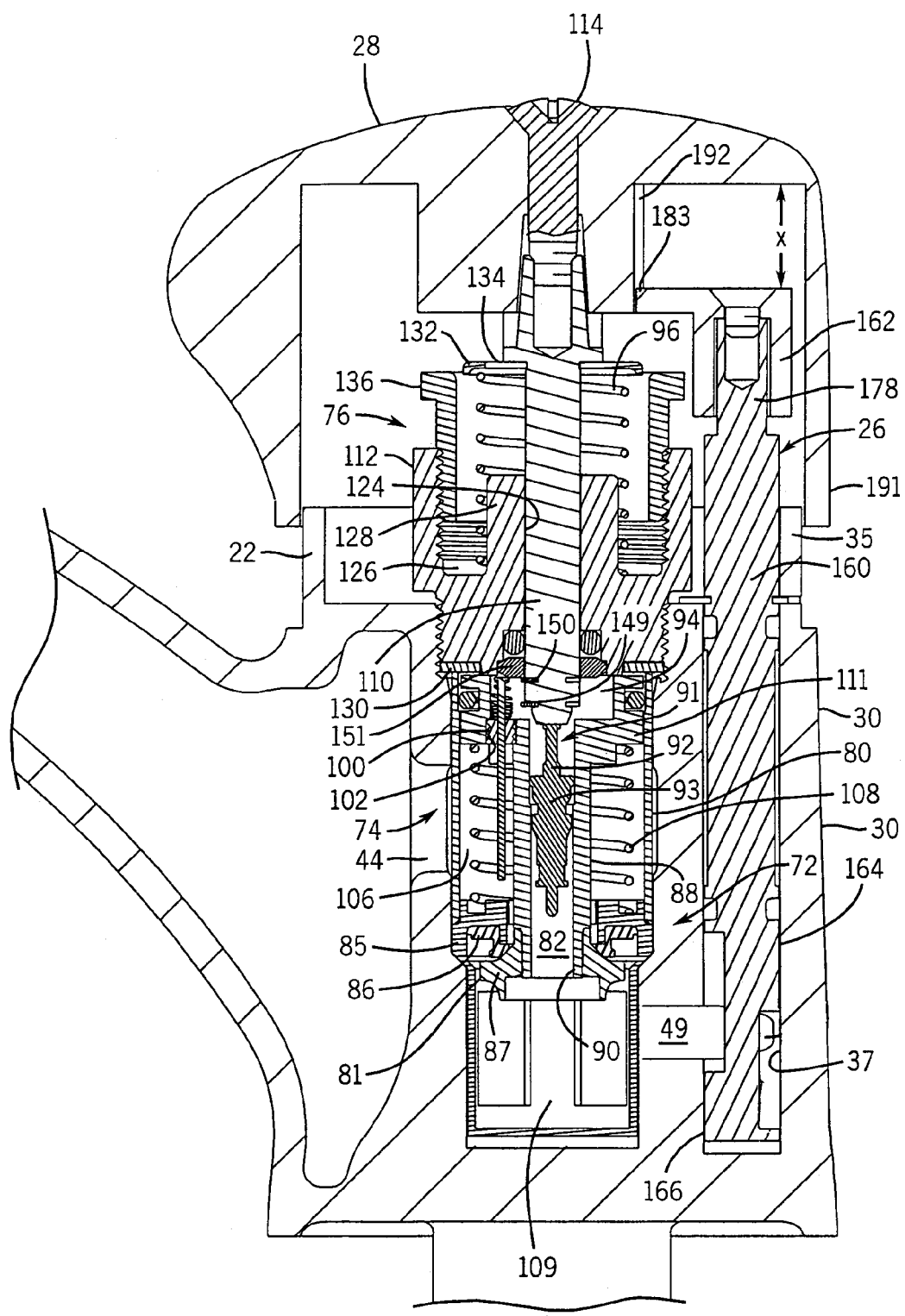
FIG. 4A is a view similar to that of FIG. 4 on an enlarged scale to illustrate additional detail of FIG. 4.
Figure 5:
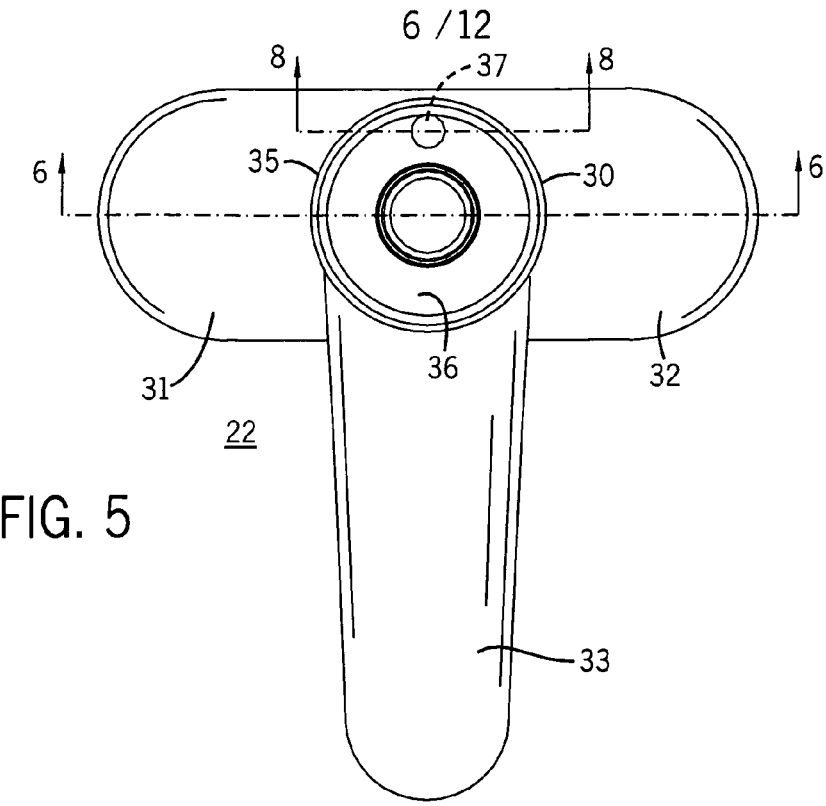
FIG. 5 is a top plan view of a casing of the metering faucet assembly of FIG. 1.
Figure 6:
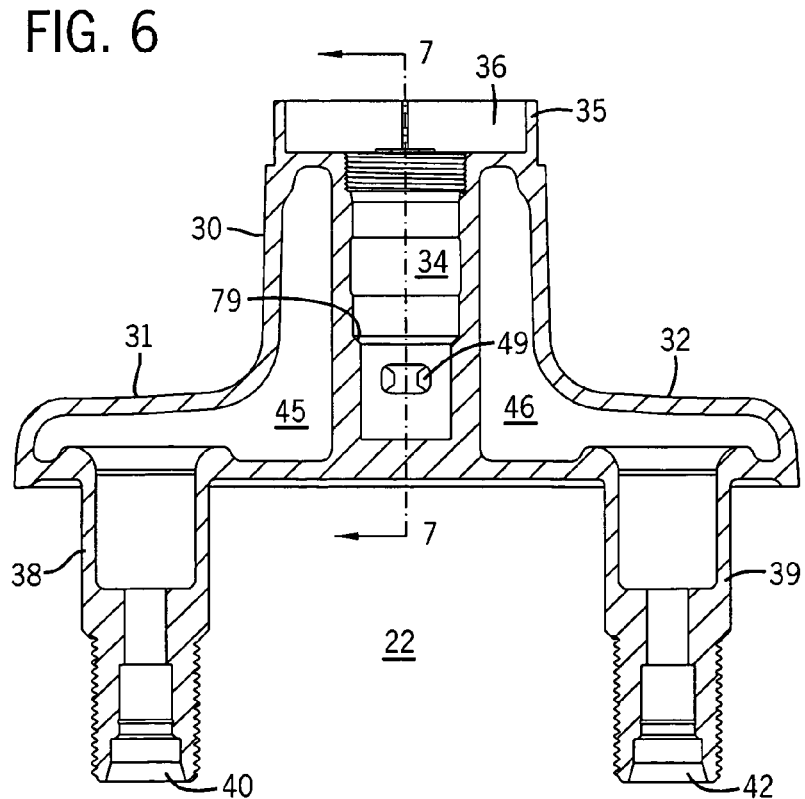
FIG. 6 is a vertical section view taken along the line 6—6 of FIG. 5.
Figure 7:
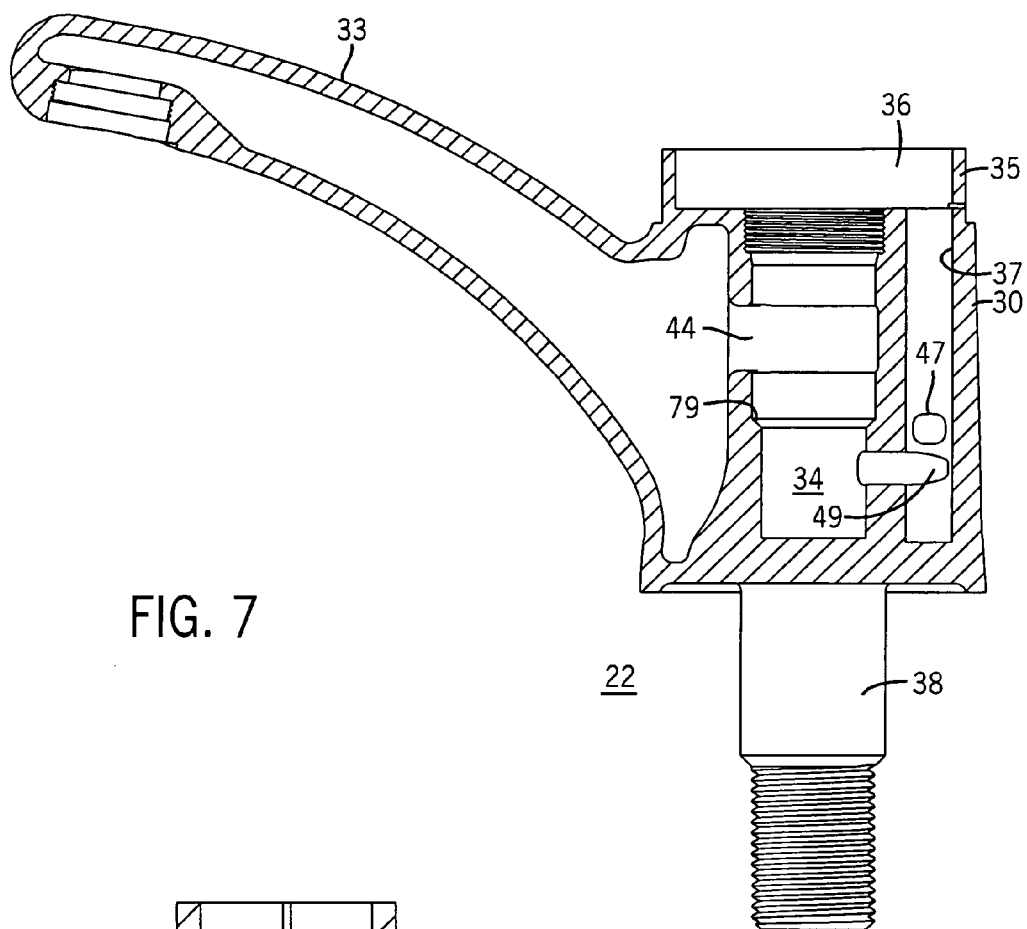
FIG. 7 is a vertical section view taken along the line 7—7 of FIG. 6.

Briefly, referring to FIG. 4A, the valve cartridge assembly 70 includes a sleeve 80 that is open ended at its upper and lower ends. A fluid inlet 81 for the shutoff valve 72 and an inlet port 82 for the metering valve 74 are located near the lower end of the sleeve 80. The sleeve 80 has an opening 84 in its sidewall near its lower end (FIG. 3), defining a fluid outlet for the valve cartridge assembly 70.

The sleeve 80 can be a stainless steel body with a plastic rim or collar 85 fixed to the sleeve 80 at its lower end and carrying a seal piece 86. The lower end of the collar 85 becomes wedged into and seals against an inner shoulder 79 (FIG. 7) of the casing 22 during installation of the cartridge valve assembly 70 in the casing 22. The seal piece 86, which can be of rubber or other suitable material, closes and seals against a valve seat member 87 that is fixed to the lower end of a plunger 88 that is slidably mounted within the sleeve 80 and movable with the plunger 88. The seal piece 86 and the valve seat member 87 are the fluid flow control components of the shutoff valve 72, with the valve seat member 87 defining the fluid inlet 81 of the shutoff valve 72. The lower end of the plunger 88 defines the inlet port 82 for the metering valve 74. The fluid outlet 84 (FIG. 3) for the valve cartridge assembly 70 is in fluid communication with the fluid outlet 44 of the casing 22 and with the spout 33 (FIG. 4).

The plunger 88 includes an axial bore 90 within which is disposed a normally closed valve 91 of the cartridge valve assembly 70. By way of example, the valve 91 can be the type commonly referred to as a Schroeder valve which can be operated open by depressing a valve stem 92 of the valve 91. The valve 91 has a valve body 93 that is secured to the plunger 88, the spring loaded valve stem 92 being movably mounted within the valve body 93 for movement between open and closed positions for the valve. The upper end of the valve stem 92 is located near the upper end of the sleeve 80 in operative relation with the lower end of a valve actuator 110. The valve 91 is interposed between the inlet port 82 and a metering chamber 94 at the upper end of the cartridge valve assembly 70.

The plunger 88 is mounted for reciprocating sliding movement within the sleeve 80 between a closed or fluid flow preventing position shown in FIG. 3, and an open or fluid flow permitting position. In the closed or fluid flow preventing state for the shutoff valve, the valve seat 87 carried by the lower end of the plunger 88 seals against the seal piece 86 contained within the collar 85. In the fluid flow permitting state for the shutoff valve, the valve seat 87 is positioned off of the seal piece 86, allowing water to flow from the fluid inlet 81 of the cartridge valve assembly through the valve seat 87, the interior 106 of the sleeve, between the inner surface of the sleeve 80 and the outer surface of the plunger 88, through opening 84 (FIG. 3) and out through the fluid outlet 44 to the spout 33. A bias spring 108, which is located within the sleeve 80 and encircles the plunger 88, biases the plunger 88 to a position that normally closes the shutoff valve 72. By way of example, the bias spring 108 can be a coil spring, encircling the plunger 88, the lower end engaging the upper surface of the collar 85 and the upper end engaging the lower surface of a peripheral flange portion 111 of the plunger 88. A basket filter 109 is located at the inlet 81 of the shutoff valve 72 the inlet 82 of the metering valve inlet 74. The filter 109 prevents sediment from entering the shutoff valve 72 and the metering valve 74 as is known in the art.

The metering valve 74 includes a valve component 100 located within a metering passageway 102 that extends between the metering chamber 94 and the interior 106 of the sleeve 80. When the valve 91 is operated open in response to depressing of the valve stem 92, fluid is allowed to flow through the valve 91 from the inlet port 82 into the metering chamber 94. The fluid is trapped temporarily within the metering chamber 94 when the operating handle 28 is released, allowing the valve 91 to close. The amount of fluid that is trapped within the metering chamber being a function of stroke length for a valve actuator 110 of the actuator assembly 76. The valve component 100 regulates flow of fluid from the metering chamber 94 to the interior 106 of the sleeve 80 during metering operations as the fluid is being bled out of the metering chamber 94. The bias spring 108 restores the plunger 88 to its fluid flow preventing position after an elapsed time, s determined by the amount of fluid that had been trapped within the metering chamber 94 as is described in the patents referenced above.

Actuator Assembly

Figure 11:
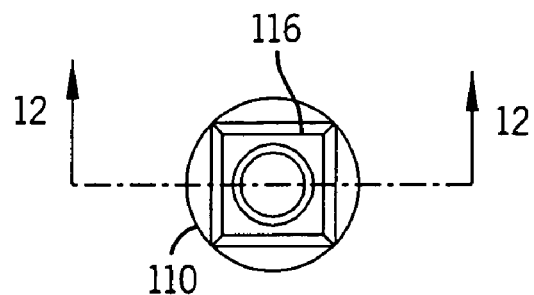
FIG. 11 is a top plan view of an actuator stem of the metering faucet assembly of FIG. 1.
Figure 12:
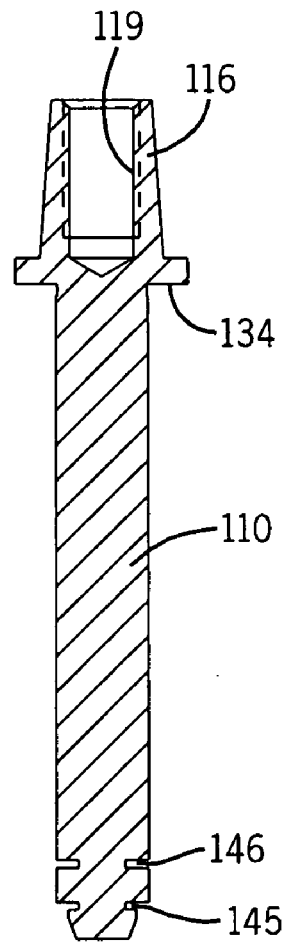
FIG. 12 is a section view of the actuator stem of FIG. 11 taken along the line 12—12 of FIG. 11.

Referring to FIGS. 3, 4A, 11 and 12, with reference to the actuator assembly 76, the valve actuator 110 which is secured to the operating handle 28 by a screw 114. As shown in FIG. 11, the upper end 116 of the valve actuator 110 is generally square in shape and is received in a complementary shaped opening 118 in the under surface of the operating handle 28 (FIG. 20) for indexing the valve actuator 110 to the operating handle 28. The lateral surfaces of the upper end 116 of the valve actuator 110 can be tapered upwardly from bottom to top as shown in FIG. 12. The upper end 116 of the valve actuator 110 has a tapped hole 119 that receives the threaded shank of the screw 114 for securing the operating handle 28 to the valve actuator 110.

The actuator assembly 76 further includes an actuator stem guide 112 having external thread that meshes with internal thread on the upper end of the casing neck portion 30 for securing the actuator stem guide 112 to the casing 22. The actuator stem guide 112 has an axial bore 124 through which extends the valve actuator 110. The actuator stem guide 112 has an annular channel 126 near its upper end that receives the lower end of the bias spring 96 which encircles the valve actuator 110. The lower end of the bias spring 96 also encircles an upstanding hub 128 in the center of the actuator stem guide 112. The upper end of the bias spring 96 engages a washer 132 overlying the top of the bias spring 96, an inner edge of the washer 132 engaging an annular shoulder 134 on the valve actuator 110. The upper end of the actuator stem guide 112 is provided with internal threads that mesh with external threads of an adjustment nut 136 that provides for adjustment of the length of stroke of the valve actuator 110, and thus adjustment in the amount of water that is discharged by the faucet in each operating cycle.

The valve actuator 110 has circumferential grooves 145 and 146 (FIG. 12) that contain e-clips 149 and 150 (FIG. 4A). The e-clip 149 extends only partially around the periphery of the lower end of the valve actuator 110 and is disposed to engage the upper end of the plunger 88, as the valve actuator 110 is being depressed. The e-clip 149 transfers the downward force on the valve actuator 110 to the plunger 88, while allowing fluid to continue to flow into the metering chamber 94. The e-clip 150 retains an O-ring seal 151 in place on the lower end of the valve actuator 110 for sealing the lower end of the valve actuator 110 relative to the housing of the actuator assembly 76. A flat washer or gasket 130 provides a seal between the actuator assembly 76 and the main casing 22 and between the actuator assembly 76 and the sleeve 80 of the valve cartridge assembly 70. The valve actuator 110 is slidable axially of the body of the valve cartridge assembly 70 and is rotatable about an axis that extends along the axis of the cartridge sleeve or body 80. The lower end of the valve actuator 110 is disposed proximal to or in engagement with the upper end of the valve stem 92.

Mixing Valve Stem Assembly

Referring to FIGS. 1 and 4, the mixing valve stem assembly 26 includes a mixing valve stem 160 that allows for adjustment in the relative proportions of hot and cold water in the mix that is delivered by the metering faucet assembly 20. The hot and cold water supplied to the inlets 40 and 42 of the metering faucet assembly 20 are delivered by the mixing valve to the outlet channel 49 which communicates the outlet 49 of the mixing valve with the inlet 81 of the shutoff valve and the inlet port 82 of the metering valve.

More specifically, with reference to FIGS. 4A, 8, 9 and 13–17, the mixing valve stem 160 includes an upper valve surface 164 and a lower valve surface 166. The upper and lower valve surfaces 164 and 166 ride on the inner surface of the bore 37 shown best in FIG. 4A. The lower valve surface 166 overlies the portion of the inner surface of the bore 37 that includes the cold water inlet port 48 (FIG. 8). The upper valve surface 164 overlies the portion of the inner surface of the bore 37 that includes the hot water inlet port 47 (FIG. 8). The valve surfaces 164 and 166 are spaced apart axially of the mixing valve stem 160, defining a circumferential channel 163 that is in fluid communication with the outlet channel 49 for delivering the hot and cold water to the outlet channel 49 for mixing the hot and cold water and delivering the water mixture to the inlet of the cartridge valve assembly 70.

In the normal at rest position, the valve surfaces 164 and 166 of the mixing valve stem 160 partially overlie the hot and cold water inlet ports 47 and 48 in the casing 22. The mixing valve stem 160 is rotatable to vary the amount of overlap between the valve surfaces 164 and 166 and the inlet ports 47 and 48, thereby adjusting the mix of hot and cold water that is delivered to the fluid inlet 81 and the inlet port 82 of the cartridge valve assembly 70. When the mixing valve stem 160 is centered as illustrated in FIG. 4, equal portions of hot and cold water are delivered to the outlet channel 49. The hot and cold water portions mix in the outlet channel 49. As the mixing valve stem 160 is rotated clockwise away from the centered position, the valve surface 166 will cover a lessor portion of the cold water inlet port 48 and the valve surface 164 will cover a greater portion of the hot water inlet port 47, decreasing the temperature of the water being delivered to the cartridge valve assembly 70. Conversely, when the mixing valve stem 160 is rotated counterclockwise, the valve surfaces 164 and 166 will cover a lessor portion of the hot water inlet port 47 and a greater portion of the cold water inlet port 48, increasing the temperature of the water being delivered to the cartridge valve assembly 70.

The mixing valve stem 160 has a surface 170 that ramps downwardly along one edge of valve surface 164 and a surface 172 that ramps upwardly along one edge of valve surface 166. The ramped surfaces 170 and 172 provide gradual opening from hot to cold as the mixing valve stem 160 is rotated.

The mixing valve stem 160 and the hot and cold water inlet ports can be designed to allow all hot water to be delivered to the cartridge valve assembly 70 or all cold water to be delivered to the cartridge valve assembly 70.

The mixing valve stem 160 includes circumferential grooves 174 and 175 that receive O-rings for providing seal between the mixing valve stem 160 and the inner wall of the bore 37 when the mixing valve stem 160 is mounted in the bore 37. The upper end 178 of the mixing valve stem 160 is splined to facilitate attachment of a coupling gear 162 as will be described.

Coupling Mechanism

With reference to FIGS. 1 and 4, in accordance with the invention, the mixing valve, including the mixing valve stem assembly 26, is separate from the cartridge valve assembly 70. The combination of a metering valve cartridge, such as valve cartridge assembly 70 and a mixing valve having a mixing valve stem 160 that extends in parallel with the longitudinal axis of the valve cartridge assembly 70, facilitates replacement of the valve cartridge assembly 70 when necessary without complete disassembly of the fluid flow control mechanism of the metering faucet assembly 20. Moreover, the metering faucet assembly 20 includes a coupling mechanism that allows a single control to operate both the cartridge valve assembly 70 and the mixing valve.

Figure 18:
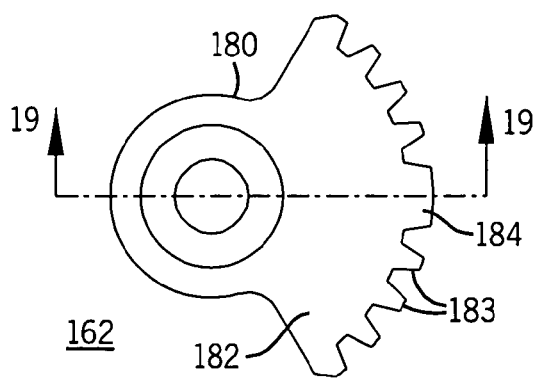
FIG. 18 is a top plan view of a coupling gear of the metering faucet assembly of FIG. 1.
Figure 19:
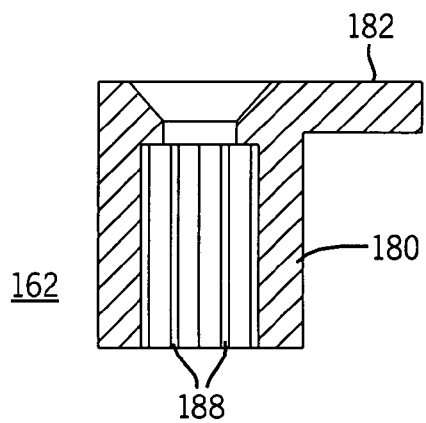
FIG. 19 is a section view taken along the lines 19—19 of FIG. 18.

More specifically, with reference to FIGS. 1, 18 and 19, the coupling mechanism includes the coupling gear 162 that couples the mixing valve stem 160 to the operating handle 28, and thus to the valve actuator 110 for the cartridge valve assembly 70. The coupling gear 162 includes a central hub 180 with a gear sector 182 that projects outwardly from the hub 180. The gear sector 182 includes a plurality of gear teeth 183 which are divided into two portions by a projection or index member 184. The coupling gear 162 is secured to the splined end 178 of the mixing valve stem 160 by a screw 186 the shank of which is received in a tapped hole in the splined end 178 of the mixing valve stem 160. The inner surface of the hub 180 includes grooves 188 to receive the splines on the splined end 178 of the mixing valve stem.

Figure 20:
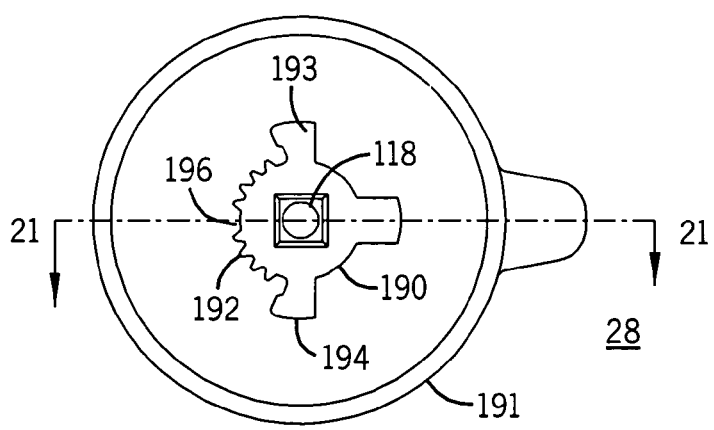
FIG. 20 is a bottom plan view of an operating handle of the metering faucet assembly of FIG. 1.
Figure 21:
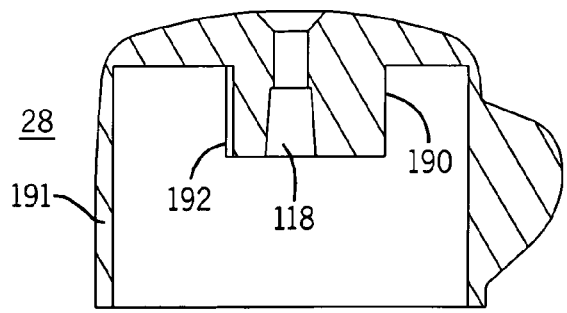
FIG. 21 is a vertical section view taken along the line 21—21 of FIG. 20.

Referring to FIGS. 20 and 21, the operating handle 28 includes a central hub 190 formed on the under surface of the operating handle 28 and projecting downwardly therefrom. The operating handle 28 includes a peripheral skirt 191 having an inner diameter that is greater than the outer diameter of the neck portion 30 of the casing 22, allowing the operating handle 28 to be mounted on the casing in telescoping relation with the neck portion 30 of the casing 22 as shown in FIG. 3, for example.

Figure 22:
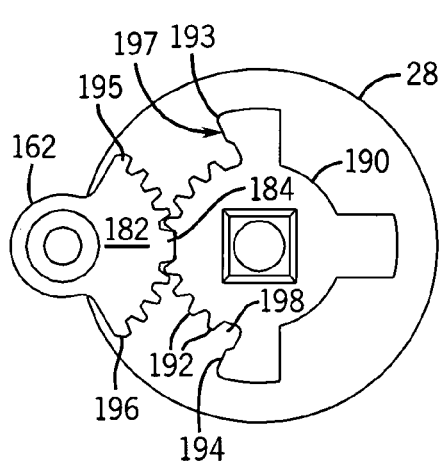
FIG. 22 is a view showing the operative relationship between the operating handle and the coupling gear of the metering faucet assembly of FIG. 1.

Referring also to FIG. 22, the central hub 190 has a toothed surface 192 that mates with and cooperates with the gear sector 182 of the coupling gear 162 as shown in FIG. 4, forming the coupling mechanism for the actuator assembly 76. The operating handle 28 has ears 193 and 194 at opposite ends of the toothed surface 192, defining travel limit stops for the mixing valve stem 160. The toothed surface 192 of the operating handle 28 is divided into two portions by a gap 196. The gap 196 is disposed to receive the index member 184 of the coupling gear 162 for ensuring that the coupling gear 162 is oriented properly with respect to the operating handle 28 during assembly of the components of the metering faucet assembly on the casing 22. The indexing member 184 of the coupling gear 162 must mate with the "open" area or gap 196 on the operating handle 28. This prevents an installer from mixing up hot/cold water selection. It is apparent that rather than being provided on the coupling gear, the index member 184 can be provided on the hub 190 of the operating handle 28 with a mating gap, corresponding to gap 196, being provided on the gear sector 182.

FIG. 22 illustrates the centered position for the coupling gear 162 and thus for the mixing valve stem. In the centered position, the index member 184 is located in the gap 196 in the toothed surface of the operating handle hub 190. In the centered position, equal portions of hot and cold water will be delivered via channel 49 to the fluid inlet 81 and the inlet port 82 (FIG. 4A) of the cartridge assembly 70.

Figure 23:
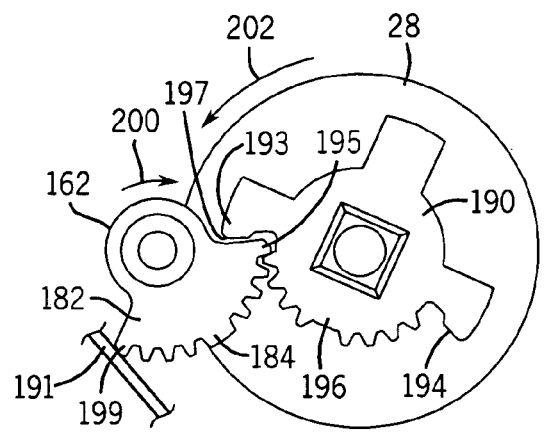
FIG. 23 is a view similar to that of FIG. 22 and showing the operating handle rotated to an end of limit position.

FIG. 23 illustrates the position for the coupling gear 162, and thus for the mixing valve stem, after the coupling gear 162 has been rotated clockwise in the direction of arrow 200 away from the centered position to the end of travel limit in response to rotation of the operating handle 28 counterclockwise in the direction of the arrow 202. The end of travel limit is reached when end projection 195 of the coupling gear 162 engages surface 197 of ear 193 of the hub 190. In this position, unequal portions of hot and cold water will be delivered via channel 49 to the fluid inlet 81/82 (FIG. 4A) of the cartridge assembly 70. It is pointed out that the operating handle can be rotated to any position between the centered position and the end of travel limit position, with the relative portions of hot and cold water delivered to channel 49 depending on the amount and direction of rotation of the operating handle. While FIG. 23 illustrates the coupling gear 162 rotated clockwise to one end of travel limit, it is apparent that the coupling gear 162 can be rotated counterclockwise, in response to clockwise rotation of the operating handle 28 to a second end of travel limit to produce the opposite mix of unequal portions of hot and cold water.

Referring to FIG. 4A, the coupling mechanism provides a slip gear arrangement that allows the valve actuator stem 110 to be reciprocated up and down with respect to the mixing valve stem 160. The coupling gear 162 is located within a space or gap between the central hub 190 and the skirt 191 of the operating handle 28. The upper surface of the coupling gear 162 is spaced apart from the lower surface of the operating handle 28 by a distance "x" such that the operating handle can be moved downwardly, relative to the mixing valve stem 160 toward the coupling gear 162 to operate the cartridge valve assembly 70. The teeth 183 of the coupling gear 162 slide along the toothed surface 192 on the central hub 190 of the operating handle 28.

Figure 24:
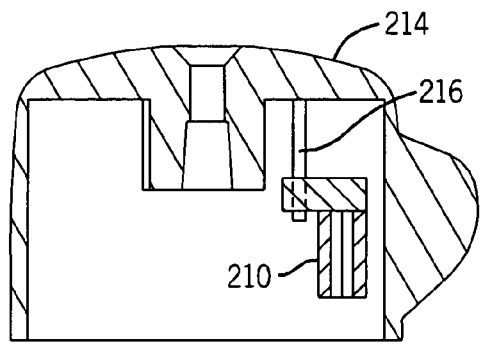
FIG. 24 is a view of an alternative operating handle and coupling member incorporating an alternative coupling mechanism in accordance with the invention.
Figure 25:
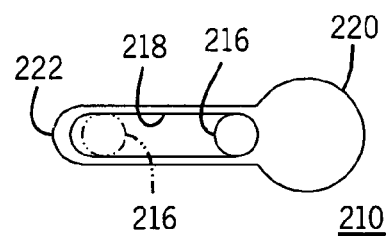
FIG. 25 is a top plan view of the coupling member of the coupling mechanism of FIG. 24.

Alternatively, the coupling mechanism can include cam follower type arrangement. For example, with reference to FIGS. 24 and 25, the coupling mechanism can include a coupling member 210 that couples the mixing valve stem 160 to an operating handle 214. The operating handle 214 includes a downwardly projecting pin 216 that extends into a channel or slot 218 on the coupling member 210. The slot 218 extends outward radially from a mounting hub 220 of the coupling member toward the peripheral edge of the coupling member. In the centered position, the pin 216 is located at the end of the slot 218 that is closest to the hub 220 of the coupling member 210 as indicated by the solid line in FIG. 25. As the operating handle 214 is rotated clockwise (or counterclockwise), the pin 216 moves along the slot toward the outer end of the slot as indicated by the dashed line in FIG. 25. In addition, the pin 216 can move vertically up and down within the slot 218 relative to the coupling member 210, providing a slip coupling for the coupling mechanism. The end 222 of slot 218 can define an end of travel limit for the coupling member and thus the mixing valve stem 160. Alternatively, the operating handle 214 and the coupling member 210 can include mating surfaces corresponding to and functioning in the manner of ears 193,194 of operating handle 28 and projecting ends 195,196 of coupling gear shown in FIG. 22, for example. Moreover, the pin can be provided on the coupling member and the slot or channel can be provided on the operating handle, defined, for example, by a wall projecting downwardly from the inner surface of the operating handle.

The use of a coupling gear 162 (or coupling member 210) to link the shutoff valve to the mixing valve stem allows two functions to be carried out with a single operating handle, namely reciprocating movement of the valve actuator 110 (a linear function) and rotational movement of the mixing valve stem 160 (a rotational movement). The slip arrangement allows vertical movement of the valve actuator 110 with respect to the mixing valve stem 160.

Referring to FIGS. 18–23, in accordance with a feature of the invention, the coupling mechanism, including the teeth 183 of the coupling gear 162 and the mating toothed surface 192 of the operating handle 28, are configured to provide compensation for side loading forces and minimize stress on teeth 183 of the coupling gear 162 at end of travel limits for the mixing valve stem 160. By way of example, the mating toothed surface 192 of the operating handle 28, defines at least first and second points of contact, between the teeth of the coupling gear and the toothed surface of the operating handle 28. In addition, mating engagement is provided between the ears 193 (and 194) on the operating handle 28 and projecting ends 195 (and 196) on the coupling gear 162 (or on coupling member 210) which define, respectively, a hot water end of travel limit and a cold water end of travel limit for the mixing valve stem 160. The configuration of the surface 197 of ear 193 is complementary to the configuration of the end projection 195. Similarly, the configuration of the surface 198 of ear 194 is complementary to the configuration of the end projection 196. In addition, if the coupling gear 162 (or coupling member 210) bottoms out or becomes canted within the handle 28, the outer edge surface of end projection 195 of the coupling gear 162 will engage the inner surface of the skirt 191, as shown in FIG. 23, providing further capture for the coupling gear at the end of travel limits. These mating surfaces of the coupling gear 162 and the operating handle 28 provide three points of contact, at each end of travel limit, to minimize stress on the gear teeth, minimizing the chance of damage to the coupling gear 162 and accounting for side loading forces.

Operation of the Metering Valve

Referring to FIGS. 3 and 4A, in operation, the metering cartridge valve 70 is normally maintained in a fluid flow preventing state by the bias springs 96 and 108. The metering cartridge valve 70 is actuated to a fluid flow permitting state by depressing the operating handle 28, against the force of the bias spring 96, which depresses the valve actuator 110. The lower end of the valve actuator 110, which is disposed proximal to or in engagement with the valve stem 92, depresses the upwardly projecting valve stem 92, opening the valve 91 to allow water to begin to flow into metering chamber 94.

With continued depression of the valve actuator 110 by the operating handle 28, the lower end of the valve actuator 110 engages the upper end portion of the plunger 88 and effects downward movement of the plunger 88, against the force of the bias spring 108. The downward movement of the plunger increases the size of the metering chamber 94 in the upper portion of the metering cartridge valve 70, filling the metering chamber 94 with a small amount of water, about a thimble's worth, for example.

As the plunger 88 is moved down, the valve seat 87 is moved fully off of the seal piece 86, opening the shutoff valve 72 to allow water to flow through the cartridge valve assembly 70 from the fluid inlet 81 (valve seat 87), through the interior 106 of the sleeve 80, the fluid outlet 84 to the fluid outlet 44 and out through the spout 33.

Figure 13:
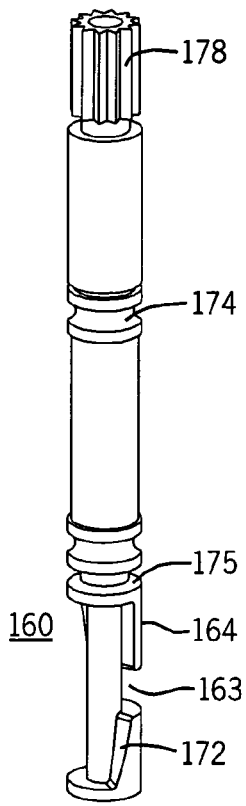
FIG. 13 is an isometric view of a metering valve stem of the metering faucet assembly of FIG. 1.
Figure 14:
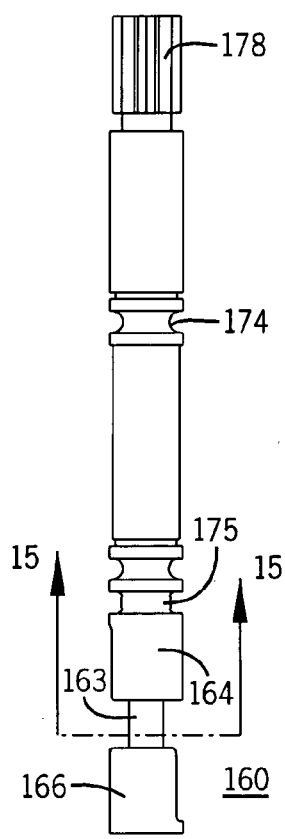
FIG. 14 is a front view of the metering valve stem of FIG. 13 as oriented in its centered position when mounted in the metering faucet assembly of FIG. 1.
Figure 16:
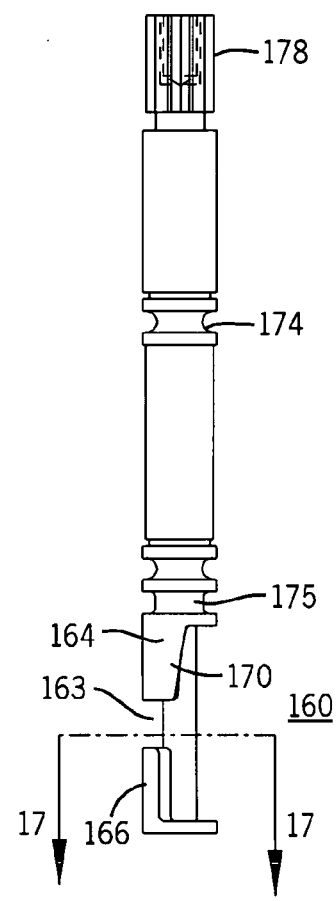
FIG. 16 is a projected view of the metering valve stem of FIG. 13.
Figure 15:
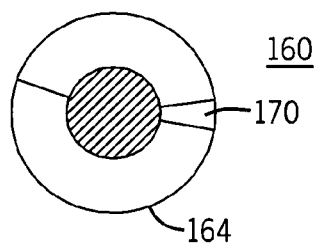
FIG. 15 is a section view taken along the lines 15—15 of FIG. 14.
Figure 17:
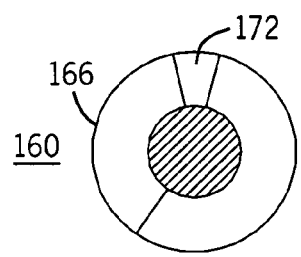
FIG. 17 is a section view taken along the lines 17—17 of FIG. 16.

Assuming that the mixing valve stem 160 is in the centered position as shown in FIG. 4A then equal portions of hot and cold water are supplied to the outlet channel 49 where the hot and cold water portions are mixed. The temperature of the water mix can be adjusted by rotating the operating handle 28 away from the centered position after the operating handle 28 has been depressed or prior to depressing the operating handle. Rotating the operating handle 28 causes rotation of the mixing valve stem 160 which is coupled to the operating handle 28 by the coupling gear 162. Referring also to FIGS. 8, 13 and 16, rotating the operating handle 28 clockwise causes the mixing valve stem 160 to be rotated counterclockwise, for example, away from the centered position, and the mixing surface 166 covers less of the hot water inlet port 47 and the mixing surface 164 will cover more of the cold water inlet port 48, increasing the temperature of the water mix supplied to the cartridge valve assembly 70. Conversely, rotating the operating handle 28 counterclockwise causes the mixing valve stem 160 to be rotated clockwise and the mixing surfaces 164 and 166 cover a greater portion of the hot water inlet port 47 and a lesser portion of the cold water inlet port 48, respectively, decreasing the temperature of the water mix supplied to the inlet 82 of the cartridge valve assembly 70. The mixing valve stem 160 and the sizes and configurations of the hot and cold water inlet ports can be designed to be settable to allow only hot water or only cold water to be discharged by the metering faucet assembly 20.

Upon release of the operating handle 28, the operating handle 28 and the valve actuator 110 are restored to their at rest positions under the force of the bias spring 96. As the valve actuator 110 restores, the downward force on the valve stem 92 is removed.

Thus, letting go of the operating handle 28 allows the valve 91 to close which causes the water contained in the metering chamber 94 to be captured within the metering chamber 94 in response to the closing of valve 91. The water contained in the metering chamber 94 bleeds out of the metering chamber 94 through metering valve components 100 along flow path 102. This provides the metering function for the metering faucet assembly 20. The amount of water captured within the metering chamber 94 and the size of the flow paths, such as flow path 102, determine when the shutoff valve 74 closes as described in the U.S. Pat. Nos. 4,899,778, 4,991,819 and 5,295,654 referenced above. Typically, the shutoff valve 74 is designed to close about 0 to 30 seconds after release of the operating handle 28.

Once the predetermined time has elapsed, the metered amount of water will have been discharged through the metering valve and the plunger 88 is returned to the closed position under the force of bias spring 108, allowing the valve seat 87 to close against the seal 86. Thus, the shutoff valve 72 will be closed through the action of the metering valve 74. If the operating handle 28 has been rotated to adjust the temperature of the water mix, the operating handle 28 will remain in the angular position to which it has been set.

Referring to FIG. 1, in accordance with a further aspect of the invention, the coupling gear 162 is a separate part from the mixing valve stem 160 and is removably mounted on the splined end 178 of the mixing valve stem 160. This allows the temperature limit for the hot and cold water mix provided at the fluid outlet of the mixing valve to be adjusted, such as to reduce the maximum temperature, for example, for the mix of water deliverable by the metering faucet assembly 20.

Adjustment of the maximum temperature is done by simply removing the coupling gear 162 from the mixing valve stem 160, rotating the coupling gear 162 relative to the mixing valve stem 160 away from a "centered" position, a few angular degrees, i.e. one or more splines, to a new position, and then reapplying the coupling gear 162 to the mixing valve stem 160 in the new relative angular position with respect to the mixing valve stem. Also, the mixing valve stem 160 is rotated to align the indexing member 184 on the coupling gear 162 with the gap 196 (FIG. 23) on the operating handle. The number of spline teeth provided on the end of the mixing valve stem determines the resolution of the adjustment.

Alternatively, the coupling gear 162 can be secured to the mixing valve stem 160 by other mechanical means such as by a set screw which, upon loosening, allows angular repositioning of the coupling gear 162 with respect to the mixing valve stem 160, without removing the coupling gear from the mixing valve stem 160. The function is the same, the coupling gear 162 is oriented in the same position with respect to the central hub of the operating handle 28. However, after adjustment, the surfaces 170 and 172 (FIGS. 13 and 16) of the mixing valve stem 160 are effectively rotated the angular amount away from the "centered" position. Thus, after such adjustment, with rotation of the coupling gear 162, more cold water will be added to the hot water, effectively reducing the maximum amount of hot water that can be added to the mix thereby reducing the maximum temperature of the water mix obtainable. This allows owners and operators of buildings to adjust hot water limit. For example, such repositioning of the coupling gear will result in a net reduction in the maximum temperature of the mixture of hot and cold water. Moreover, the temperature of the water mix can be increased by making an opposite adjustment in the relative angular orientation of the coupling gear 162 with respect to the mixing valve stem 160. The precision of the adjustment is dependent upon the number of teeth and a finer adjustment can be provided by providing finer teeth on the splined portion 178 of the mixing valve stem 160 and the mating surfaces 188 of the coupling gear 162.

It may therefore be appreciated from the above detailed description of the preferred embodiment of the present invention that it provides a metering faucet assembly that includes separate shutoff and mixing valves that have valve actuators that are spaced apart from one another in the faucet casing and are operated along different axes. The valve actuator for the shutoff valve and the mixing valve stem for the mixing valve are coupled together by a coupling mechanism that allows both the mixing valve and the cartridge valve assembly to be operated by a common operating handle. Moreover, the coupling mechanism includes a slip gear mechanism that allows reciprocating movement of the valve actuator for the cartridge valve assembly and rotational movement of the mixing valve stem. In addition, the coupling mechanism provides end of travel limits for the mixing valve stem and is adjustable to provide adjustment in the temperature limit of the hot water, for example, in the mix.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A faucet assembly comprising:
   a casing, said casing defining first and second fluid inlets and a fluid outlet;
   a fluid flow control valve within said casing, said fluid flow control valve having a fluid inlet and a fluid outlet, said fluid outlet of said fluid flow control valve in fluid communication with said fluid outlet of said casing, said fluid flow control valve controlling fluid flow between said fluid inlet of said fluid flow control valve and said fluid outlet of said casing;
   a mixing valve within said casing, separate from said fluid flow control valve, said mixing valve interposed between said first and second fluid inlets of said casing and said fluid inlet of said fluid flow control valve, said mixing valve including a mixing valve member; and
   a valve actuator member extending along a first operating axis for operating said fluid flow control valve between flow preventing and flow permitting states, said valve actuator member coupled to said mixing valve member of said mixing valve, said mixing valve operable to adjust the mix of first and second fluids delivered to said fluid inlet of said fluid flow control valve, wherein said mixing valve member extends along a second operating axis that is offset with respect to said first operating axis.

2. The faucet assembly according to claim 1, including a coupling mechanism including a slip gear mechanism that couples said mixing valve stem to said valve actuator member, allowing a single, manually operable handle to provide rotational movement of said mixing valve stem for operating said mixing valve, and at least reciprocating movement of said valve actuator member for operating said fluid flow control valve.

3. The faucet assembly according to claim 1, wherein said mixing valve member comprises an elongated mixing valve stem having a longitudinal axis that extends along said second operating axis, said second operating axis extending parallel to said first operating axis.

4. The faucet assembly according to claim 3, and including a coupling mechanism coupling said mixing valve stem to said valve actuator member.

5. The faucet assembly according to claim 4, wherein said coupling mechanism includes a slip gear mechanism that allows said valve actuator member to be moved axially along and rotatably about said first operating axis.

6. The faucet assembly according to claim 4, wherein said coupling mechanism defines at least one travel limit stop for said mixing valve stem.

7. The faucet assembly according to claim 4, wherein said coupling mechanism includes a coupling gear mounted on said mixing valve stem and mating gear teeth on an operating handle that is coupled to said valve actuator.

8. The faucet assembly according to claim 4, wherein said coupling mechanism allows reciprocating movement of said valve actuator member with respect to said mixing valve stem.

9. The faucet assembly according to claim 7, wherein said coupling mechanism defines at least first and second points of contact between teeth of said coupling gear and surfaces of said operating handle to compensate for side loading forces and to minimize stress on teeth of said coupling gear at end of travel limits for said mixing valve stem.

10. A metering faucet assembly comprising:
a casing, said casing defining hot and cold water inlets and a fluid outlet;
a fluid flow control mechanism within said casing interposed between the hot and cold water inlets and said fluid outlet of said casing, said fluid flow control mechanism including a fluid flow valve operable between fluid flow preventing and fluid flow permitting states and a metering valve for causing said fluid flow control valve to be operated from said fluid flow permitting state to said fluid flow preventing state;
a mixing valve within said casing, separate from said fluid flow valve, said mixing valve interposed between the hot and cold water inlets and an inlet of said fluid flow valve, said mixing valve including an elongated mixing valve member having a longitudinal axis that is offset with respect to an operating axis for said fluid flow valve; and
an operating mechanism for operating said mixing valve to adjust the mixture of hot and cold water delivered to said fluid inlet of said fluid flow valve and operating said fluid flow valve to deliver the mixture of hot and cold water to said fluid outlet of said casing.

11. The metering faucet assembly according to claim 10, wherein said longitudinal axis of said mixing valve member extends parallel to said operating axis of said fluid flow valve.

12. The metering faucet assembly according to claim 10, wherein said operating mechanism includes an actuator member associated with said fluid control valve, and a coupling mechanism for coupling said mixing valve member to said actuator member.

13. The metering faucet assembly according to claim 12, wherein said coupling mechanism includes a slip mechanism that allows said actuator member to be moved axially along and rotatably about said operating axis relative to said casing.

14. The metering faucet assembly according to claim 13, wherein said slip mechanism includes a coupling member mounted on said mixing valve stem, and a pin carried by one of the operating handle and the coupling member, the pin extending into a channel or slot on the other one of the operating handle and the coupling member.

15. The metering faucet assembly according to claim 13, wherein said slip mechanism includes a gear member mounted on said mixing valve stem and having gear teeth that mesh with gear teeth of said actuator mechanism.

16. The metering faucet assembly according to claim 15, wherein said operating mechanism includes an operating handle coupled to said actuator member, and wherein said operating handle includes said gear teeth of said operating mechanism.

17. A metering faucet assembly comprising:
a casing;
a metering cartridge valve within said casing, said metering cartridge valve operable to deliver a mixture of a metered amount of hot and cold water from hot and cold water inlets of the casing to a fluid outlet of the casing;
a mixing valve for determining the mixture of hot and cold water delivered to the fluid outlet of the casing, said mixing valve including an elongated mixing valve stem mounted in said casing, said mixing valve stem having a longitudinal axis; and
a common operating mechanism for operating said metering cartridge valve and said mixing valve, said operating mechanism including an actuator member, said longitudinal axis of said mixing valve stem extending substantially parallel to an operating axis for an actuator member.

18. The metering faucet assembly according to claim 17, wherein the longitudinal axis of said mixing valve stem extends parallel to said operating axis for said actuator member.

19. The metering faucet assembly according to claim 17, wherein said operating mechanism includes a slip gear mechanism coupling said mixing valve stem to said metering cartridge valve, said slip gear mechanism allowing said actuator member to be reciprocated along and rotated about said operating axis.

20. The metering faucet assembly according to claim 19, wherein said slip gear mechanism includes a coupling gear mounted on said mixing valve stem and having gear teeth mating with gear teeth of said actuator mechanism.

21. The metering faucet assembly according to claim 20, wherein said operating mechanism includes an operating handle mounted on said actuator member, and wherein said coupling gear includes an index member that mates with a surface of said operating handle for orienting said coupling gear with respect to said operating handle.

22. The metering faucet assembly according to claim 20, wherein said operating mechanism defines at least one travel limit stop for said mixing valve stem.

23. The metering faucet assembly according to claim 17, wherein said metering cartridge valve assembly is removably mounted within said casing and is removable from said casing independently of said mixing valve.

24. A metering faucet assembly comprising:
a casing defining a cavity;
a metering cartridge valve assembly within said cavity;
a mixing valve separate from said metering cartridge valve assembly, said mixing valve including an elongated mixing valve stem mounted in said casing; and
a common operating mechanism for operating said metering cartridge valve assembly and said mixing valve, wherein said mixing valve stem has a longitudinal axis that extends substantially parallel to an operating axis for an actuator member for said metering cartridge valve assembly.

25. A faucet assembly comprising:
a casing;
a fluid flow valve assembly within said casing, said fluid flow assembly including a shut off valve and a valve actuator disposed for reciprocating movement along an operating axis for operating said shut off valve between flow preventing and flow permitting positions;
a mixing valve for adjusting a mixture of hot and cold water delivered to a fluid outlet of said casing, said mixing valve including a mixing valve stem mounted within said casing; and
an operating mechanism including an actuator member for reciprocating said valve actuator of said fluid flow valve assembly and a coupling mechanism coupling said operating mechanism to said mixing valve stem, enabling said operating mechanism to operate said mixing valve, said coupling mechanism including a slip gear mechanism that permits at least reciprocation of said actuator member along said operating axis and rotation of said valve stem member about a further axis.

26. The faucet assembly according to claim 25, wherein said operating mechanism includes a single operating handle coupled to said actuator member, said operating handle being manually operable to reciprocate said actuator member along said operating axis and being rotatable to cause rotation of said mixing valve stem.

27. The faucet assembly according to claim 26, wherein said operating mechanism defines at least one travel limit stop for said mixing valve stem.

28. The faucet assembly according to claim 25, wherein said slip gear mechanism includes a coupling gear mounted on said mixing valve stem, said coupling gear having gear teeth that mesh with gear teeth of said operating mechanism.

29. The faucet assembly according to claim 28, wherein said operating mechanism includes an operating handle coupled to said actuator member, said operating handle including said gear teeth of said operating mechanism.

30. The faucet assembly according to claim 29, wherein said coupling mechanism defines at least first and second points of contact between teeth of said coupling gear and surfaces of said operating handle to compensate for side loading forces and to minimize stress on teeth of said coupling gear at end of travel limits for said mixing valve stem.

31. The faucet assembly according to claim 29, wherein said coupling gear includes an index member that mates with a surface of said operating handle for orienting said coupling gear with respect to said operating handle.

32. The faucet assembly according to claim 28, wherein said coupling gear is removably mounted on said mixing valve stem.

33. The faucet assembly according to claim 32, wherein said coupling gear is repositionable on said mixing valve stem rotated from a first angular position to a second angular position, thereby varying the angular orientation of the mixing valve stem and thus a high temperature setting for the mixture of hot and cold water delivered to the fluid outlet of the casing.

34. The faucet assembly according to claim 25, wherein said operating mechanism includes a single operating handle coupled to said actuator member, said coupling mechanism operatively coupling said operating handle to said mixing valve stem, said operating handle being manually operable to reciprocate said actuator along the operating axis and being rotatable to cause rotation of said mixing valve stem.

35. A method of adjusting the mixture of hot and cold water discharged by a faucet assembly, the faucet assembly including a fluid flow control valve within a casing, an operating mechanism for the fluid flow valve, including a valve actuator member adapted for reciprocating movement along an operating axis, and a mixing valve, said method comprising the steps of:

mounting a mixing valve stem of the mixing valve on the casing with a longitudinal axis of the mixing valve stem extending parallel to the operating axis of the valve actuator member;

coupling the mixing valve stem to the valve actuator member;

rotating the operating mechanism to rotate the mixing valve stem about its longitudinal axis to change the setting of the mixing valve, thereby changing the mix of the hot and cold water supplied to an inlet of the fluid flow valve; and depressing the operating handle to operate the fluid flow valve to deliver the mixture to a fluid outlet of the faucet assembly.

36. The method according to claim 35, wherein coupling the mixing valve stem to the valve actuator member includes indexing the coupling gear with the actuating mechanism coupling the mixing valve stem to the valve actuator member using a coupling mechanism that includes a slip gear mechanism.

37. The method according to claim 35, wherein coupling the mixing valve stem to the valve actuator member includes using a coupling mechanism that includes a slip gear mechanism.

38. The method according to claim 36, including adjusting a maximum temperature limit of the mixture of hot and cold water by rotating the coupling gear with respect to the mixing valve stem from a first angular position to a second angular position, thereby varying the angular orientation of the coupling gear with respect to the mixing valve stem and thus amounts of the hot and cold water for the mix of hot and cold water delivered to the fluid outlet of the casing.

39. The method according to claim 38, wherein adjusting a maximum temperature limit of the mixture of hot and cold water includes removing the coupling gear from the metering valve stem prior to varying the angular orientation of the coupling gear and then reinstalling the coupling gear on the mixing valve stem rotated away from the first angular position.

* * * * *